Sept. 15, 1942.                B. E. SHAW                 2,296,063
                            AUXILIARY FAN SWITCH
                            Filed June 26, 1939            2 Sheets-Sheet 1
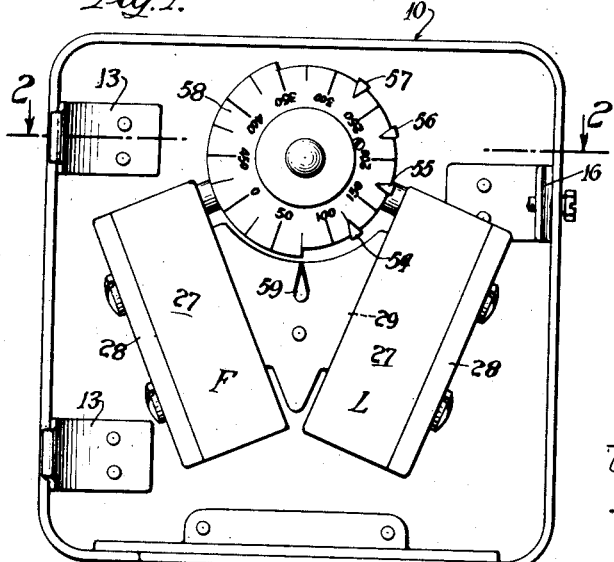
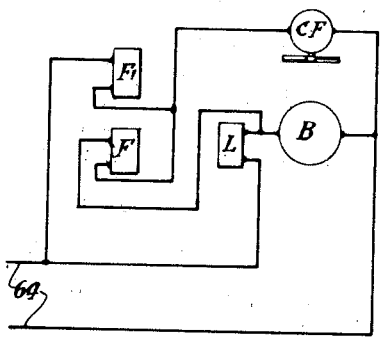
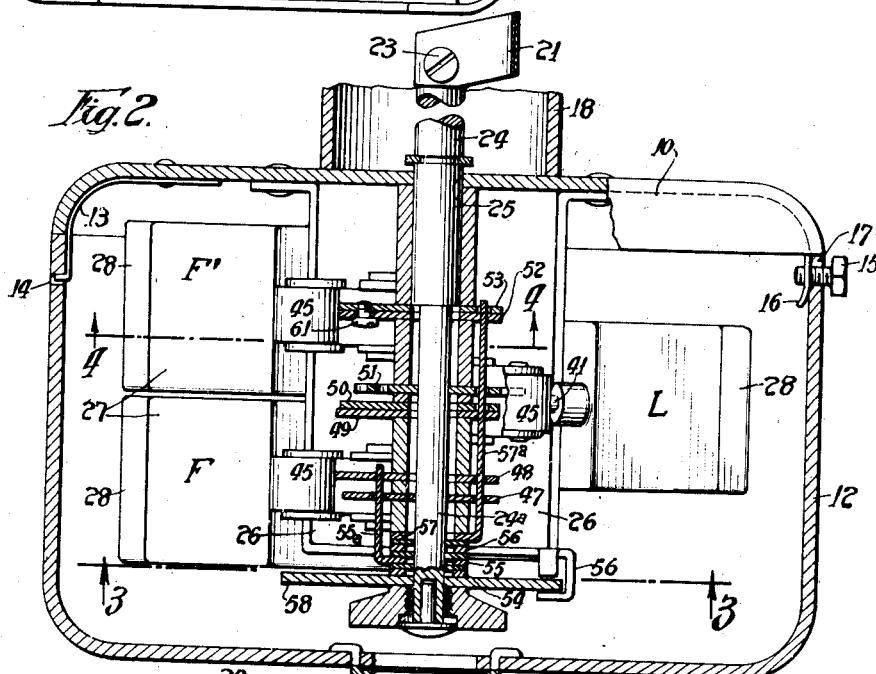
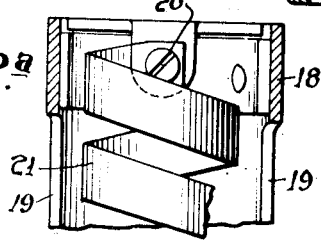
Inventor:
Burton E. Shaw,
By: Bair & Freeman
Attorneys.

Sept. 15, 1942.   B. E. SHAW   2,296,063
AUXILIARY FAN SWITCH
Filed June 26, 1939   2 Sheets-Sheet 2
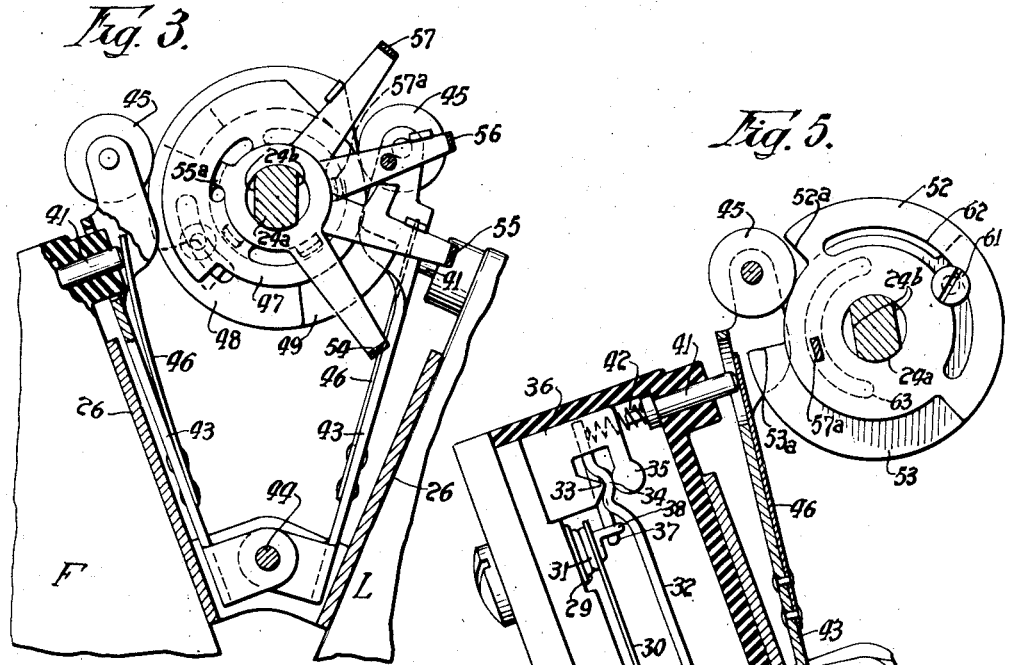
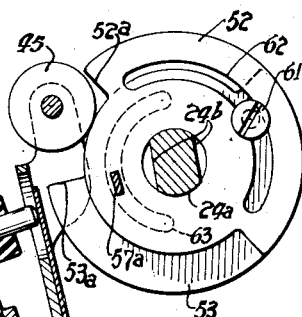
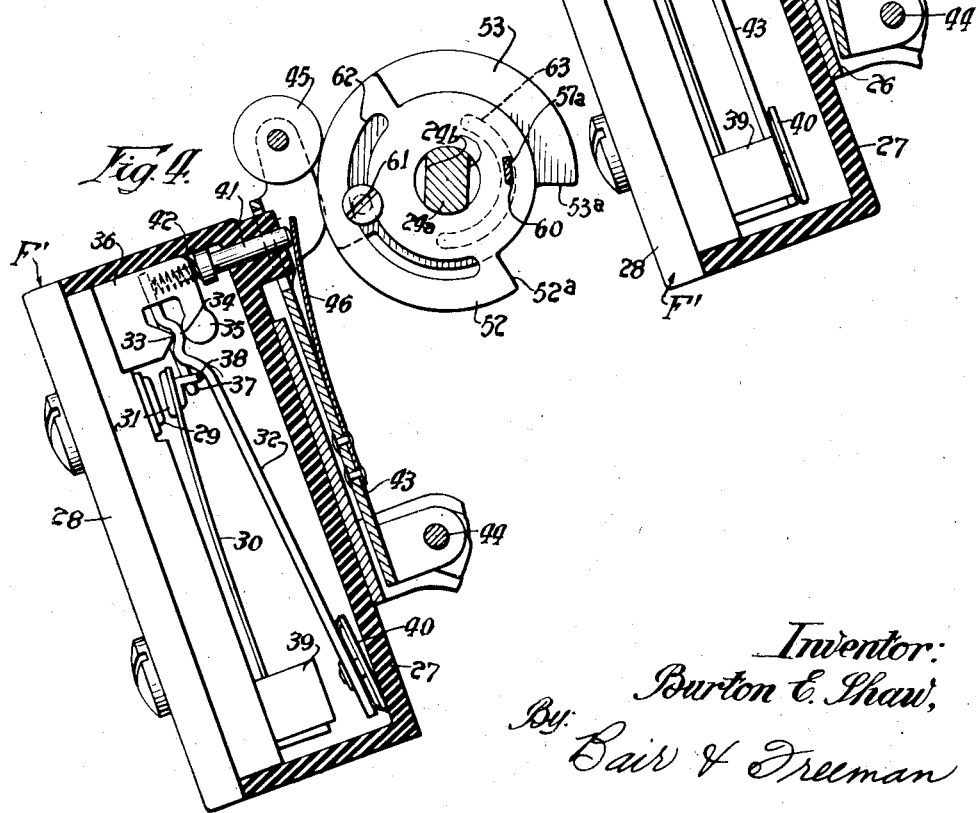
Inventor:
Burton E. Shaw,
By Bair & Freeman
Attorneys.

Patented Sept. 15, 1942

2,296,063

UNITED STATES PATENT OFFICE 2,296,063

AUXILIARY FAN SWITCH

Burton E. Shaw, Bristol, Ind., assignor to Penn Electric Switch Co., Goshen, Ind., a corporation of Iowa Application June 26, 1939, Serial No. 281,120

6 Claims. (Cl. 200—138)

An object of my present invention is to provide an auxiliary fan switch in conjunction with a combined fan and limit switch of the type disclosed in my patent No. 2,231,686, granted February 11, 1941, and dealing with a combined fan and limit switch.

Another object is to provide the auxiliary fan switch designed to be mounted in the same casing as the fan and limit switches and cooperating with the same camshaft that is rotated by the temperature responsive element of the switch structure.

Still another object is to provide an auxiliary fan switch which is connected in the circuit of the circulating fan of a furnace or the like so that when either the fan and limit switches or the auxiliary fan switch are in closed position the circulating fan will operate.

Still another object is to provide the temperature responsive element so hooked up with the fan, limit and auxiliary fan switches that it will successively turn the fan switch on, the limit switch off and the auxiliary fan switch on, as the temperature rises, and will successively turn the auxiliary fan switch off, the limit switch on and the fan switch off upon a fall in the temperature, the temperature responsive element being mounted in the plenum chamber of a hot air furnace, or otherwise responsive to the heat of the heating system.

A further object is to provide a safety control which takes care of excessive heat in the heating plant which might be developed even after the limit switch is turned off, due for instance to a prolonged operation of the burner and resultant excessive overrun after the limit switch is opened which brings the heating plant up to a dangerously high temperature, the auxiliary fan switch being turned on before such dangerous temperature is reached so as to operate the circulating fan and thereby dissipate the excess heat to avoid such dangers as igniting lint in the air filters or the like.

Another object is to provide a cam arrangement for operating the auxiliary fan switch which is suitably timed relative to the limit switch and adjustable with it to operate the auxiliary fan switch at a predetermined temperature spread with respect to the operation of the limit switch.

Still a further object is to provide a means for stopping the rotation of the temperature responsive element after the auxiliary fan switch has been turned on so that further temperature rise will not rotate the cams excessively and result in undesired operation of the fan switch due to greater than one revolution of the temperature responsive element throughout the range of temperatures affecting it.

The foregoing, other and further objects of the invention will be apparent to those skilled in the art to which this invention appertains, by reference to the following description, accompanying drawings and appended claims. An embodiment of the invention is illustrated in the accompanying drawings, in which the several views thereof are as follows:

Figure 1 is a front elevation of a switch structure embodying my invention with the cover plate removed therefrom;

Figure 2 is a sectional view on the line 2—2 of Figure 1 showing the parts on an enlarged scale;

Figure 2a is an extension of the upper end of Figure 2;

Figure 3 is a sectional view on the line 3—3 of Figure 2, showing all of the cams for the fan, limit and auxiliary fan switches;

Figure 4 is a similar sectional view on the line 4—4 of Figure 2 showing the cams for the auxiliary fan switch in section;

Figure 5 is a similar sectional view showing the auxiliary fan switch cams rotated to position for closing the circuit of the auxiliary fan switch, and Figure 6 is an electrodiagrammatic view showing the circuit connections of the fan, limit and auxiliary fan switches with a circulating fan and blower.

On the accompanying drawings I have used the reference numeral 10 to indicate a relatively shallow casing. A relatively deep cover 12 is provided therefor, retained in position as by a pair of metal strips 13 entering perforations 14 of the cover 12, as shown in Figure 2, and a set screw 15 threaded in another metal strip 16 and passing through a slot 17 in the cover 12.

Extending rearwardly from the casing 10 is a supporting tube 18 having slots as at 19 to permit heat to readily enter the tube. Anchored as at 20 to the outer end of the tube is a coiled bimetal element 21 having its inner ends secured as at 23 to an actuating rod 24. The rod 24 is journaled in a bearing opening 25 of the casing 10.

Mounted on a bracket 26 extending from the back of the casing 10 are three switch units F, L and F". Each of these switch units comprises a casing 27 and a base member 28 forming a closure therefor. On the base member 28 a stationary contact 29 is mounted and a leaf spring 30 has a movable contact 31 constrained to engage the stationary contact 29.

For disengaging the contacts 29 and 31 a switch arm 32 is pivoted at V points 33 with an arched portion 34 of the arm 32 contacting the V points and retained thereagainst by extensions 35 of a bracket 36 on which the V points are formed. The switch arm 32 has a tongue 37 passing through a perforated bracket 38 of the leaf spring 30. A permanent magnet 39 is mounted on the base 38 and an armature 40 is mounted on the switch arm 32 for cooperation with each other to provide snap action for the switch unit. An actuating pin 41 is slidable in the casing 27 and operatively connected with the switch arm 32 by a spring 42.

Each switch unit further includes an actuating lever 43, all three of which are pivoted on a pin 44 carried by the bracket 26. Each lever 43 includes a roller 45 for coaction with a cam later to be described and an actuating spring 46 for coaction with the actuating pin 41 of the switch unit.

The switch units F, L and F' are a fan switch, a limit switch and an auxiliary fan switch, respectively. For operating the limit switch L, I provide cams 49, 50 and 51. For operating the auxiliary fan switch F', I provide cams 52 and 53. All of these cams with the exception of 51 are rotatable on a reduced portion 24a of the actuating shaft 24 which has flattened sides indicated at 24b in Figure 3, with which the cam 51 coacts and is thereby slidable and non-rotatable on the rod.

Also the cams 47, 48, 49 and 50 coact with the actuating shaft 24 in the manner set forth in my copending application hereinbefore referred to and wherein is fully described the various pointers 54, 55, 56 and 57, together with an indicating dial 58 and an index pointer 59 (see Figure 1). The pointers 54 and 55 are for setting the fan switch F for temperatures at which it is turned off and on, respectively. The pointers 56 and 57 are for the temperatures at which the limit switch L is turned on and off, respectively. This is accomplished through the use of extensions such as 55a and 57a from the pointer 57 for adjusting the cams 48 and 49, respectively, other extensions (not shown) being extended from the pointers 54 and 56 for adjusting the cams 47 and 50, respectively, all as set forth in detail in my copending application.

As a result of the cam adjusting arrangement, when temperature affecting the bimetal 21 increases, the fan switch F will be turned on at 175°, and the limit switch L will be turned off at 275°. The extension 57a, it will be noted (see Figures 2, 4 and 5) extends through the cams 52 and 53. In the cam 52 I provide a perforation 60 so that this cam is adjusted simultaneously with the adjustment of the cam 49. The cam 52 is the one that turns the auxiliary fan switch F' on and may have any desired relationship to the cam 49 for turning the limit switch off. For instance, I have found 35° a satisfactory temperature spread. Therefore with the limit switch L having its cam 49 adjusted for turning the limit switch off at 275°, the cam 52 will turn the auxiliary fan switch F' on at 310°. This position has just been assumed in Figure 5, the roller 45 having just dropped off the shoulder 52a of the cam 52 due to rotation of the cam in a clockwise direction.

The cam 53 has a shoulder 53a adapted upon further rotation of the actuating shaft 24 caused by temperature rise to engage the roller 45 in such manner as to act as a stop for further rotation of the shaft. This prevents the cam 47 from again actuating the fan switch F in an undesirable manner. The cams 52 and 53 are secured together by a screw 61 passing through an arcuate slot 62 of the cam 52 and threaded into the cam 53. This permits adjustment of the stop shoulder 53a relative to the shoulder 52a for turning the auxiliary fan switch on. To prevent interference of the extension 57a with such adjustment, the cam 53 is provided with an arcuate slot 63 for the extension 57a to pass through.

In Figure 6, I have shown an electrodiagrammatic view in which the current supply wires are indicated at 64. Current may be supplied to them under control of a room thermostat or relay in the usual manner, and it will be noted that the fan switch F and the limit switch L are connected in series and the auxiliary fan switch F' is connected in parallel with the fan and other limit switches. The shunt connected switches are in series with a circulating fan CF. The limit switch L is connected in series with a burner B in the usual manner.

*Practical operation*

In the operation of my switch structure, when the room thermostat energizes the wires 64, the burner B will be energized because the limit switch L is normally in closed position. As the furnace warms up the shaft 24 will rotate, so that successively the fan switch F will be turned on at 175° and the limit switch will be turned off at 275°. If thereafter the furnace continues to heat up or its temperature becomes dangerously high from residual heat, the fan switch F' will be turned on at 310°, thus causing the circulating fan to operate and dissipate the heat. This avoids such dangers as igniting lint in the air filters. If the temperature goes on up, say to 400°, the shoulder 53a of the cam 53 will engage the roller 45 of the switch F' and stop further rotation of the shaft 24.

As the furnace cools down, when it attains a temperature of 285° the auxiliary fan switch F' will be turned off. If there is still too much residual heat, the temperature may again go up to 310° and turn on the auxiliary fan switch. This cycle of operation of the circulating fan under control of the auxiliary fan switch F' might occur several times under extraordinary conditions, such as a room thermostat circuit being shorted. If the temperature recedes properly, however, the limit switch L will be turned on again at 225°, but if the room thermostat is then open the burner will not operate and the temperature will recede until the fan switch F is turned off at 125°.

From the description of my switch structure and its operation, it will be obvious that I have provided an additional safety feature (the auxiliary fan switch) which operates upon an excessive temperature even after the limit switch has been turned off and thereby dissipates the heat when at a dangerously high temperature, which might otherwise cause serious damage.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a device of the class described, a temperature responsive element, a fan switch, a limit switch and an auxiliary fan switch, cams for each of said switches operated by said temperature responsive element whereby upon rise in temperature affecting said temperature responsive element the cam for said fan switch will turn it on, the cam for said limit switch will turn it off and the cam for said auxiliary fan switch will turn it on, respectively, and, upon a fall of temperature affecting said temperature responsive element, the cam for said auxiliary fan switch will turn it off, the cam for said limit switch will turn it on and the cam for said fan switch will turn it off, respectively.

2. In a device of the class described, a temperature responsive element, a fan switch, a limit switch and an auxiliary fan switch, said fan and limit switches being connected in series with a circulating fan and said auxiliary fan switch shunting said fan and limit switches, cams for each of said switches operated by said temperature responsive element whereby upon rise in temperature affecting said temperature responsive element the cam for said fan switch will turn it on, the cam for said limit switch will turn it off and the cam for said auxiliary fan switch will turn it on, respectively, and, upon a fall of temperature affecting said temperature responsive element, said cam will reversely operate said switches.

3. In a device of the class described, a temperature responsive element, a fan switch, a limit switch and an auxiliary fan switch, cams for each of said switches operated by said temperature responsive element whereby, upon rise in temperature affecting said temperature responsive element, the cam for said fan switch will turn it on, the cam for said limit switch will turn it off and the cam for said auxiliary fan switch will turn it on, respectively, and, upon a fall of temperature affecting said temperature responsive element, the cam for said auxiliary fan switch will turn it off, the cam for said last switch will turn it on and the cam for said fan switch will turn it off, respectively, the cam for said auxiliary fan switch being operable to turn it on a fixed degree of rotation after the cam for said limit switch has turned it off.

4. In a device of the class described, a temperature responsive element, a fan switch, a limit switch and an auxiliary fan switch, cams for each of said switches operated by said temperature responsive element whereby, upon rise in temperature affecting said temperature responsive element, the cam for said limit switch will turn it off and the cam for said auxiliary fan switch will turn it on, respectively, and, upon a fall of temperature affecting said temperature responsive element, the cam for said auxiliary fan switch will turn it off, the cam for said last switch will turn it on and the cam for said fan switch will turn it off, respectively, the cam for said limit switch being adjustable with respect to said temperature responsive element and the cam for said auxiliary fan switch being connected therewith and being operable to turn said auxiliary fan switch on a fixed degree of rotation after the limit switch has been turned off.

5. In a device of the class described, a temperature responsive element, a fan switch, a limit switch and an auxiliary fan switch, cams for each of said switches operated by said temperature responsive element whereby, upon rise in temperature affecting said temperature responsive element, the cam for said fan switch will turn it on, the cam for said limit switch will turn it off and the cam for said auxiliary fan switch will turn it on, respectively, and, upon a fall of temperature affecting said temperature responsive element, the cam for said limit switch will turn it on and the cam for said fan switch will turn it off, respectively, the cam for said auxiliary fan switch being operable to turn it on a fixed degree of rotation after the cam for said limit switch has turned it off, and a stop for the cam of said auxiliary fan switch to prevent rotation of said temperature responsive element to a further position causing the cam for said fan switch to turn it off again.

6. In a device of the class described, a temperature responsive element, a fan switch, a limit switch and an auxiliary fan switch, operating elements for each of said switches operated by said temperature responsive element whereby upon rise in temperature affecting said temperature responsive element the operating element for said fan switch will turn it on, the operating element for said limit switch will turn it off and the operating element for said auxiliary fan switch will turn it on, respectively, and, upon a fall of temperature affecting said temperature responsive element, the operating element for said auxiliary fan switch will turn it off, the operating element for said limit switch will turn it on and the operating element for said fan switch will turn it off, respectively.

BURTON E. SHAW.